No. 810,412. PATENTED JAN. 23, 1906.
J. O. HOBBS.
SHAFT AND CLUTCH MECHANISM.
APPLICATION FILED OCT. 22, 1903.
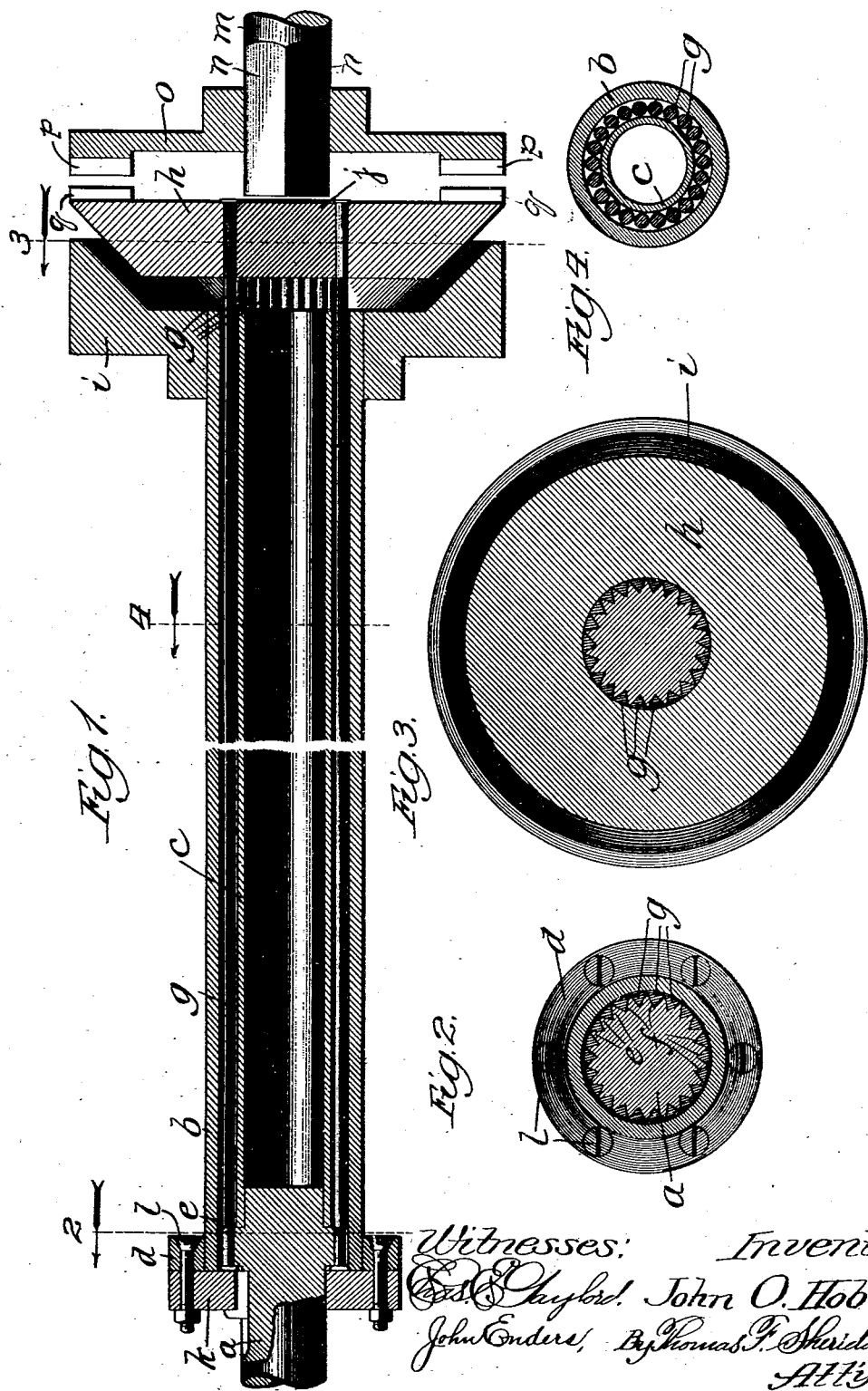
Witnesses: Inventor.
John O. Hobbs,
By Thomas F. Sheridan,
Atty.

# UNITED STATES PATENT OFFICE.

JOHN O. HOBBS, OF CHICAGO, ILLINOIS.

SHAFT AND CLUTCH MECHANISM.

No. 810,412.  Specification of Letters Patent.  Patented Jan. 23, 1906.

Application filed October 22, 1903. Serial No. 178,145.

*To all whom it may concern:*

Be it known that I, JOHN O. HOBBS, a citizen of the United States, residing at Chicago, in the county of Cook and State of Illinois, am the inventor of certain new and useful Improvements in Shaft and Clutch Mechanisms, of which the following is a specification.

My invention relates to that class of shafts provided with means for forming a yielding connection between such shaft and a driving-shaft or between such shaft and another shaft or mechanism to be driven thereby.

The principal object of the invention is to provide a shaft with suitable means for forming a yielding connection between such shaft and a driving or driven shaft and adapted to cause such initial yielding connection to gradually become permanent and positive.

A further object of the invention is to provide a shaft comprising a flexible portion formed of a multiplicity of rods and a rigid portion or portions connected with such flexible portions, with means for first connecting the flexible portion with the driving or driven shaft, and then connecting such rigid portion with the driving or driven shaft positively, so as to relieve the flexible portions of the greater part of the strain to which such shaft is subjected, producing at first a yielding connection with the driving or driven shaft and gradually increasing the rigidity of the connection and of the flexible portions of the shaft until the connection is positive.

Other and further objects of the invention will appear from an examination of the drawings and the following description and claims.

My invention consists in the features, combinations, and details of construction hereinafter described and claimed.

In the accompanying drawings, Figure 1 is a longitudinal sectional elevation of a shaft and clutch mechanism constructed in accordance with my improvements; Fig. 2, a cross-sectional elevation, taken on line 2 of Fig. 1, through the rigid portion of one end of the shaft; Fig. 3, a view in elevation, taken on line 3 of Fig. 1, looking in the direction of the arrow, showing the movable flexibly-connected clutch member in section; and Fig. 4, a cross-sectional elevation taken on line 4 of Fig. 1, showing the flexible rods between the inner core or sleeve and the outer cylindrical or tubular portion of the shaft.

In constructing a shaft and clutch mechanism in accordance with my improvements I provide a shaft comprising rigid and flexible portions, the rigid portion or portions of such shaft being composed of a main body or solid shaft portion $a$, upon the end of which is mounted an outer tubular portion $b$ and an inner core portion $c$, mounted on the inside of and concentric with such outer tubular portion. I prefer to make the inner core hollow for the sake of economy and lightness of construction. The outer tubular portion is provided with a flange $d$, which I prefer to connect therewith by means of brazing, and the outer tubular portion and inner core portion are rigidly connected together and to the main or solid body portion of the shaft by brazing them both to the end of such shaft. The above elements together form the rigid portion of the shaft. The end of the main solid body portion of the shaft is enlarged at its point of connection with the outer tubular portion, so as to form a plug portion $e$. This enlarged portion or plug is provided with preferably triangular perforations or openings $f$ therethrough, which are formed in a circle corresponding to the space between the inner core and the outer tubular portion. Suitable flexible rods $g$, which I prefer to make of tempered steel, are provided with correspondingly triangular-shaped end portions, which are inserted in the perforations in the plug and headed or riveted, so as to be held firmly thereby. These rods form the flexible portion of the shaft. The opposite ends of these rods are mounted in a similar manner in a movably-mounted clutch portion $h$, which is here shown and described as the male clutch portion, the female clutch portion $i$ being mounted, preferably, rigidly upon the end of the outer tubular portion of the shaft, to which it may be connected by means of brazing. It will of course be understood that the relative portions of these male and female clutch members may be reversed, if desired. While the ends of the rods may be mounted in triangular openings or notches around the edge of a large central opening in the clutch member, I prefer to provide a cylindrical plug $j$, having triangular notches in its outer edge, such plug being inserted tightly in the central opening in the clutch member, so as to hold the rods, which are headed or riveted, firmly in position. A ring $k$ is keyed to the solid portion of the shaft and is connected to the flanged end of the outer tubular portion by means of bolts $l$, so as to permit the rods to be mounted in position and strengthen the connections between the parts.

The driving-shaft $m$, which is to be at first yieldingly connected with the shaft above described and such connection gradually caused to become more rigid until it finally becomes positive, is provided with an angular end portion $n$, upon which is slidably mounted a clutch $o$, having a central perforation corresponding in form to the angular end portion of the driving-shaft, so as to rotate therewith. This clutch member is provided with suitable studs or shoulder portions $p$, adapted to engage similar studs or shoulder portions $q$ on the flexibly-mounted clutch member. The latter is mounted between the clutch member $i$ on the driving-shaft and the one upon the rigid tubular portion of the flexible shaft, already described, and may thus be thrown into or out of frictional engagement when desired. Suitable pinion or other connecting mechanism (not shown) may be mounted upon the opposite end of the main solid body portion of the flexible shaft mechanism, whereby the machinery to be driven—such, for instance, as that of an automobile—may be connected operatively with the flexible shaft and clutch mechanism herein described, and thereby with the driving-shaft, such connection being at first yielding and gradually becoming more rigid until it is positive.

Although I have shown the clutch member which is mounted upon the flexible rods as adapted to be connected with the driving-shaft, it will of course be understood that the relation of the driving and driven shafts to the flexible and rigid portions, respectively, of the flexible shaft mechanism may readily be reversed. I prefer, however, the arrangement of these parts substantially as herein described and shown. By this arrangement the driving-shaft may be rotated in either direction, and by moving the clutch member $o$, which is slidably mounted thereon, into engagement with the flexibly-mounted clutch member the rods are caused to rotate in a corresponding direction, and a yielding connection is thus formed between the rigid portion of the flexible shaft mechanism and the driving-shaft. This flexible connection gradually becomes more rigid as the flexible rods are wound around the inner core. The winding of the rods causes the flexibly-mounted clutch member to come at first into yielding contact with the clutch member on the outer tubular portion of the flexible shaft mechanism and finally into positive contact therewith, thus forming at first a yielding and finally positive connection between the driving-shaft and the driven mechanism. The advantages of this device, particularly in connection with the driving mechanism of an automobile, will be appreciated by those skilled in the art.

I claim—

1. In a shaft and clutch mechanism, of the class described, the combination of a shaft comprising a rigid clutch portion and flexible portions, and a clutch member connected to the flexible portions of such shaft and rotatable against the tension thereof in either direction into positive contact with the rigid shaft portion, substantially as described.

2. In a shaft and clutch mechanism of the class described, the combination of a rigid shaft portion rotatably mounted, a clutch member movable into and out of positive engagement therewith, and a plurality of flexible rods extending longitudinally of and each connected at one end to such rigid shaft portion and at the other end to such movable clutch member, substantially as described.

3. In a shaft and clutch mechanism of the class described, the combination of a shaft comprising an inner core portion and rotatably mounted, a clutch member movably mounted with relation to such inner core portion, and flexible rods extending longitudinally of the inner core portion connected at one end therewith and at the other end with the movable clutch member and forming a flexible portion of such shaft, substantially as described.

4. In a shaft and clutch mechanism of the class described, the combination of a shaft comprising rigid outer tubular and inner core portions and rotatably mounted, a clutch member movably mounted with relation to the rigid portion of such shaft, and flexible elements mounted between the outer tubular and inner core portions yieldingly connecting such rigid shaft portion with the movable clutch member and forming a flexible portion of the shaft, substantially as described.

5. In a shaft and clutch mechanism of the class described, the combination of a shaft provided with a rigid shaft portion rotatably mounted, a clutch member movable into and out of positive contact therewith, flexible elements yieldingly connected to such rigid shaft portion and connnected to and supporting the movable clutch member, and means for connecting such movable clutch member with a driving-shaft, substantially as described.

6. In a shaft and clutch mechanism of the class described, the combination of a shaft provided with a rigid shaft portion rotatably mounted, a clutch member mounted thereon, a clutch member movable into and out of positive contact with such rigid shaft portion and its clutch member, flexible rods connected at one end with the rigid shaft portion and at the other end extending beyond the end of the rigid shaft portion and connected with such movable clutch member, and means for connecting such movable clutch member with a mechanism to be operated in connection therewith, substantially as described.

7. In a shaft and clutch mechanism of the class described, the combination of a shaft provided with a rigid portion rotatably mounted, a clutch member mounted thereon in fixed relation thereto, a clutch member movable into and out of positive contact with such rigid shaft portion and its clutch member, flexible rods connected at one end with the rigid shaft portion and at the other end with and supporting such movable clutch member, means for connecting such movable clutch member with a driving-shaft, and means mounted at the opposite end of such shaft upon which the flexible rods are mounted for operatively connecting such shaft to a mechanism to be driven thereby, substantially as described.

8. In a shaft and clutch mechanism of the class described, the combination of a shaft provided with a rigid portion rotatably mounted, a clutch member mounted upon and in fixed relation to the rigid portion of such shaft, a clutch member movable into and out of positive contact with such rigid shaft portion and its clutch member, flexible rods connected at one end with the rigid portion of such shaft and at the other end extending beyond the end of the rigid shaft portion and connected with and supporting such movable clutch member and forming the flexible portion of the flexible shaft, and means for connecting such movable clutch member with a mechanism to be operated in connection therewith, substantially as described.

9. In a shaft and clutch mechanism of the class described, the combination of a shaft provided with a rigid portion and rotatably mounted, a clutch member rigidly connected thereto and provided with an inclined friction-surface, a clutch member movably mounted with relation to such first-mentioned clutch member and having an inclined friction-surface adjacent thereto movable into and out of positive contact therewith, flexible elements yieldingly connecting such rigid shaft portion with and supporting such movable clutch member, and means for connecting such movable clutch member with a shaft to be operated in connection therewith, substantially as described.

10. In a shaft and clutch mechanism of the class described, the combination of a shaft provided with a rigid portion and rotatably mounted, a clutch member rigidly connected thereto and provided with an inclined friction-surface, a second clutch member movable into and out of positive contact therewith, a plurality of flexible rods connected at one end with the rigid shaft portion and at the other end with and supporting the movable clutch member and forming the flexible portion of such shaft, a driving-shaft, a clutch member slidingly mounted thereon movable into and out of engagement with the movable clutch member, and means for connecting the rigid portion of the flexible shaft with a mechanism to be operated in connection therewith, substantially as described.

11. In a shaft and clutch mechanism of the class described, the combination of a shaft provided with a rigid portion and having an annular core, a clutch member connected to such rigid shaft portion, a clutch member movably mounted with relation to the rigid shaft portion and core, flexible rods connected at one end to the rigid shaft portion extending along the outer surface of the core and connected at their opposite ends to such movable clutch member, and means for connecting such movable clutch member with a driving-shaft and disconnecting it therefrom, substantially as described.

12. In a shaft and clutch mechanism of the class described, the combination of a shaft provided with a rigid portion rotatably mounted and comprising an outer tubular portion and an inner core portion, a clutch member mounted upon such outer tubular portion, a clutch member movably mounted with relation to such shaft portion and its clutch member, a plurality of flexible rods attached at one end to the rigid shaft portion and at the other end to the movable clutch member and extending between the inner core and outer tubular portion of such shaft, and means for connecting such movable clutch member with a driving-shaft, substantially as described.

13. In a shaft and clutch mechanism of the class described, the combination of a shaft comprising a rigid portion and flexible rods attached to such rigid portion, and a rotatable member attached to such flexible rods and rotatable with relation to the rigid shaft portion in opposite directions against the tension of the rods into engagement with the rigid shaft portion, substantially as described.

14. In a shaft and clutch mechanism of the class described, the combination of a rigid shaft portion, a plurality of normally straight flexible elastic rods each having one end secured to such rigid shaft portion in fixed relation thereto, and a movable member secured in fixed relation to the opposite ends of such flexible rods and rotatable in opposite directions with relation to the rigid shaft portion.

15. In a shaft and clutch mechanism of the class described, the combination of a rigid shaft portion, a plurality of normally straight flexible elastic rods arranged in parallel relation to each other each having one end secured to such rigid shaft portion, and a movable member secured to the opposite ends of such flexible rods and rotatable in opposite directions with relation to the rigid shaft portion.

JOHN O. HOBBS.

Witnesses:
HARRY I. CROMER,
ANNIE C. COURTENAY.